(12) United States Patent
Bu et al.

(10) Patent No.: US 7,532,658 B2
(45) Date of Patent: May 12, 2009

(54) APPARATUS FOR REDUCING ELECTROMAGNETIC INTERFERENCE AND METHOD THEREFOR

(75) Inventors: Lin-Kai Bu, Shanhua Township, Tainan County (TW); Chung-Ming Huang, Shanhua Township, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 604 days.

(21) Appl. No.: 10/854,329

(22) Filed: May 27, 2004

(65) Prior Publication Data

US 2004/0240522 A1    Dec. 2, 2004

(30) Foreign Application Priority Data

May 29, 2003    (TW) ............... 92114627 A

(51) Int. Cl.
*H04B 1/00*    (2006.01)
(52) U.S. Cl. ............... 375/130; 375/376; 375/346; 375/136; 375/294
(58) Field of Classification Search ............... 375/130, 375/376, 200, 346, 136, 294; 345/204, 3, 345/212; 348/820
See application file for complete search history.

(56) References Cited

U.S. PATENT DOCUMENTS

| | | | | |
|---|---|---|---|---|
| 5,631,920 A | * | 5/1997 | Hardin | 375/130 |
| 5,659,339 A | * | 8/1997 | Rindal et al. | 345/212 |
| 5,872,807 A | * | 2/1999 | Booth et al. | 375/130 |
| 6,046,735 A | * | 4/2000 | Bassetti et al. | 345/204 |
| 6,292,507 B1 | * | 9/2001 | Hardin et al. | 375/130 |
| 2004/0213324 A1 | * | 10/2004 | Hall et al. | 375/130 |

* cited by examiner

*Primary Examiner*—Shuwang Liu
*Assistant Examiner*—Kabir A Timory
(74) *Attorney, Agent, or Firm*—Rabin & Berdo, P.C.

(57) ABSTRACT

An apparatus for reducing electromagnetic interference and a method therefor. The invention generates a spread-spectrum clock according to an original clock, receives a data bit stream according to the original clock, and outputs the data bit stream according to the spread-spectrum clock. The apparatus of the invention includes a spread-spectrum buffer for temporarily storing the data bit stream, a frequency generator for generating a spread-spectrum clock according to an up signal and a down signal, and a spread-spectrum controller for determining the up signal and the down signal according to the storage of the spread-spectrum buffer.

20 Claims, 7 Drawing Sheets

APPARATUS FOR REDUCING ELECTROMAGNETIC INTERFERENCE AND METHOD THEREFOR

This application claims the benefit of Taiwan application Serial No. 092114627, filed May 29, 2003, the subject matter of which is incorporated herein by reference.

BACKGROUND OF THE INVENTION

1. Field of the Invention

The invention relates to an apparatus for reducing electromagnetic interference and a method therefor, and more particularly to an apparatus for reducing electromagnetic interference using spread-spectrum clocks and a method for the same.

2. Description of the Related Art

Because electromagnetic interference (EMI) often occurs between electrical products, it is necessary to restrict the intensity of the electromagnetic waves radiated therefrom. For example, Federal Communication Commission (FCC) has specified an EMI standard to restrict the radiation level of the electrical product.

FIG. 1 is a schematic illustration showing the radiation intensity for a clock signal. The radiation intensity I for a signal with a single frequency f0 tends to exceed the EMI standard represented as Ie. For example, a typical method for solving the EMI problems is to spread the spectrum of the signal so as to prevent the radiation intensity from concentrating on some frequency and thus to reduce the electromagnetic interference. FIG. 2 is a schematic illustration showing the radiation intensity for a spread-spectrum clock signal. The frequency of the spread-spectrum clock signal is distributed between the frequencies f1 and f2, so the radiation intensity may be dispersed to meet the EMI standard.

FIG. 3 is a schematic illustration showing a liquid crystal display module. The liquid crystal display module includes a transfer controller 300, a source driver 310 and a gate driver 320. The transfer controller 300 transfers data bit streams and clock signals to the source driver 310 and the gate driver 320. However, since a bus line for transferring signals from the transfer controller 300 to the source driver 310 and the gate driver 320 is quite long, the signal frequency gets higher as the resolution of the liquid crystal display gets higher, thereby causing more serious electromagnetic interference.

The electromagnetic interference of the typical liquid crystal display may be reduced by generating spread-spectrum clocks. However, such a method may cause data loss. In detail, since the spread-spectrum clock and the original clock have different frequencies while the input data is still input according to the frequency of the original clock, data loss may be easily caused to distort the image.

SUMMARY OF THE INVENTION

It is therefore an object of the invention to provide a spread-spectrum clock generator with reduced electromagnetic interference but without data loss, and a method for the spread-spectrum clock generator.

The invention achieves the above-identified object by providing an apparatus for reducing electromagnetic interference. The apparatus generates a spread-spectrum clock according to an original clock, receives a data bit stream according to the original clock, and outputs the data bit stream according to the spread-spectrum clock. The apparatus includes a spread-spectrum buffer for temporarily storing the data bit stream, a frequency generator for generating a spread-spectrum clock according to an up signal and a down signal, and a spread-spectrum controller for determining the up signal and the down signal according to the storage of the spread-spectrum buffer.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
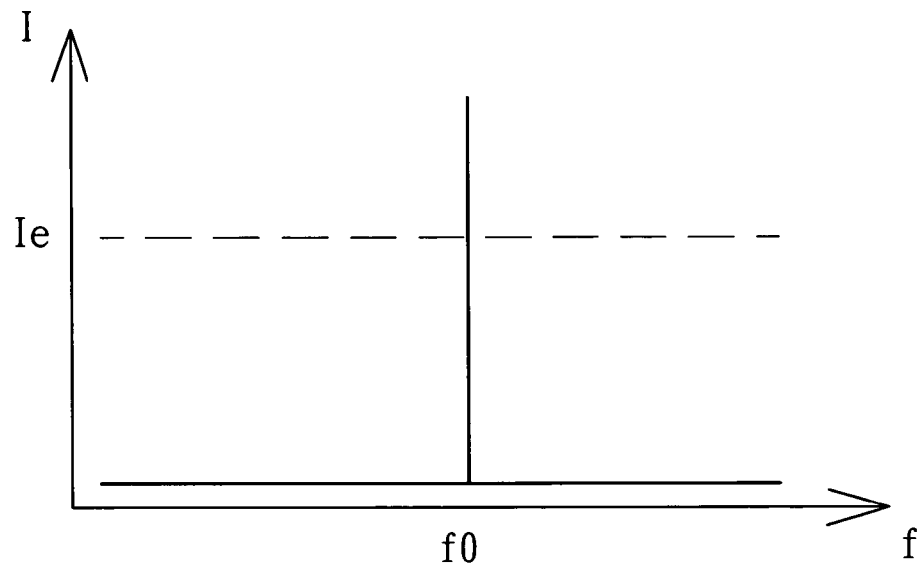
FIG. 1 is a schematic illustration showing the radiation intensity for a clock signal.
Figure 2:
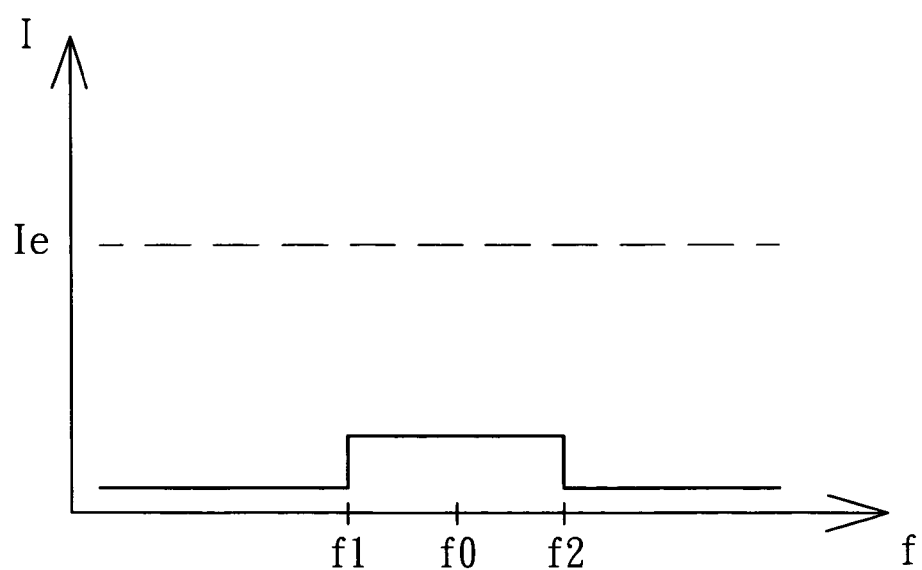
FIG. 2 is a schematic illustration showing the radiation intensity for a spread-spectrum clock signal.
Figure 3:
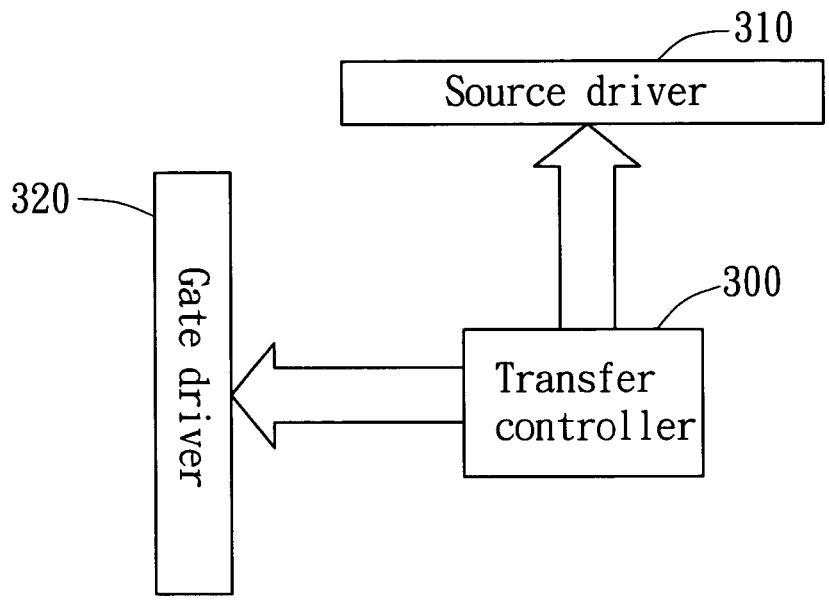
FIG. 3 is a schematic illustration showing a liquid crystal display module.
Figure 4:
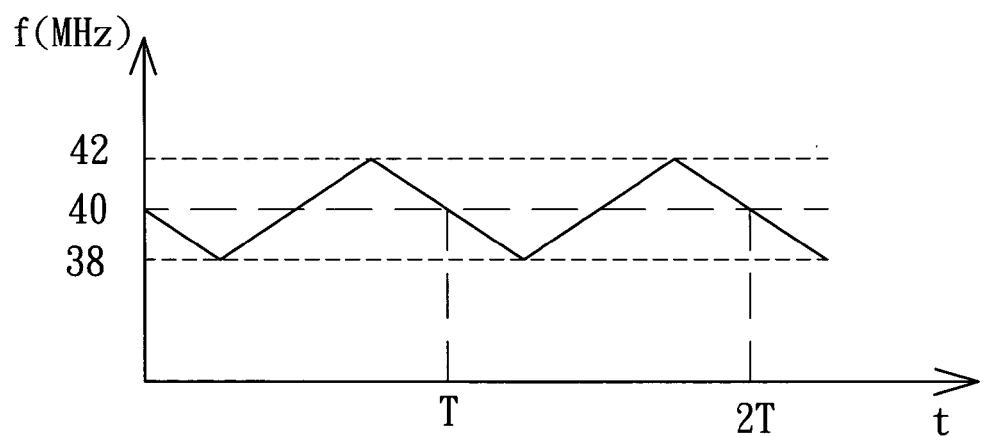
FIG. 4 is a graph showing relationships between the frequency and time of the original clock and the conventional spread-spectrum clock.

FIG. 4 is a graph showing relationships between the frequency and time of the original clock and the conventional spread-spectrum clock. The frequency of the original clock is held at, for example, 40 MHz, and the frequency of the spread-spectrum clock stably sweeps from 38 MHz to 42 MHz, wherein the sweeping period T is 1/30K seconds for example. An upward correction point is existed at, for example, time T/4, in each period, wherein the downward descending tendency of the frequency of the spread-spectrum clock is corrected to the upward ascending tendency. In addition, a downward correction point is existed at, for example, time 3T/4, in each period, wherein the upward ascending tendency of the frequency of the spread-spectrum clock is corrected to the downward descending tendency. As the frequency of the spread-spectrum clock is spread more (i.e., as the magnitude of spread spectrum of the spread-spectrum clock gets greater), the electromagnetic interference may be more effectively improved. However, since the data is output and input according to the spread-spectrum clock and the original clock, respectively, the frequency difference between both of them is too great and the problem of data loss tends to occur. If the magnitude of spread spectrum of the spread-spectrum clock is smaller, the problem of data loss cannot easily occurs, but the effect of improvement on the electromagnetic interference is poor.

An object of the invention is to effectively reduce the electromagnetic interference using the spread-spectrum clock and to avoid the problem of data loss after the spread-spectrum clock is used. The invention mainly utilizes a buffer to temporarily store data and to monitor the storage of the buffer so as to tune the frequency of the output spread-spectrum clock.

Figure 5A:
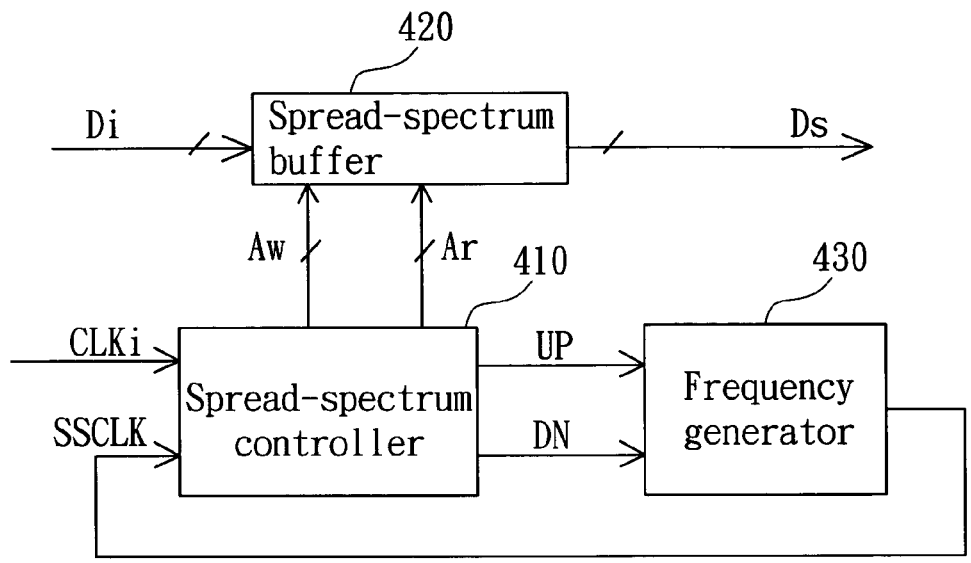
FIG. 5A is a block diagram showing an apparatus for reducing electromagnetic interference according to a preferred embodiment of the invention.

FIG. 5A is a block diagram showing an apparatus for reducing electromagnetic interference according to a preferred embodiment of the invention. The invention may be applied to, for example, a transfer controller of a liquid crystal display for receiving an original clock CLKi and a data bit stream Di, and then generating a spread-spectrum clock SSCLK and a data bit stream Ds accordingly. The apparatus for reducing the electromagnetic interference includes a spread-spectrum controller 410, a spread-spectrum buffer 420, and a frequency generator 430. The spread-spectrum buffer 420 stores the data bit stream Di according to a write-in address Aw, and outputs the data bit stream Ds according to a read-out address Ar. The spread-spectrum controller 410 receives the original clock CLKi to determine the write-in address Aw of the data bit stream Di accordingly, and receives a feedback spread-spectrum clock SSCLK to determine the read-out address Ar of the data bit stream Ds accordingly. A difference between the read-out address Ar and the write-in address Aw represents the storage of the spread-spectrum buffer 420, and is referred to as a buffer index Idx. The spread-spectrum controller 410 utilizes an up signal UP or a down signal DN to command the frequency generator 430 to tune up or tune down the frequency of the generated spread-spectrum clock SSCLK according to the buffer index Idx. For example, the frequency generator 430 may be a phase lock loop (PLL).

Figure 5B:
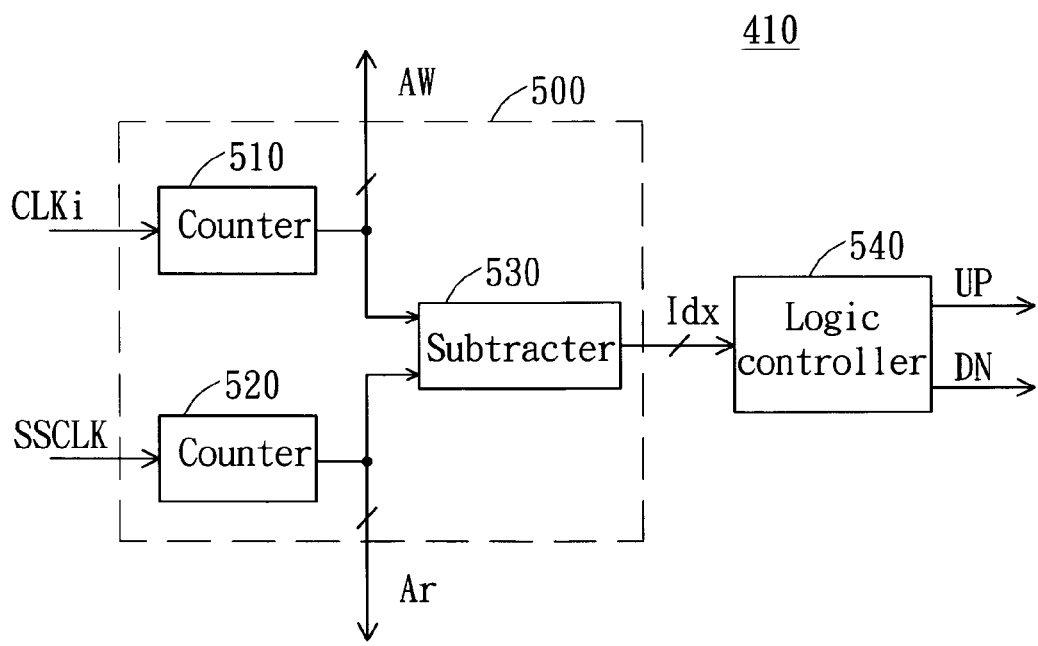
FIG. 5B is a block diagram showing an example of a spread-spectrum controller.

FIG. 5B is a block diagram showing an example of a spread-spectrum controller. The spread-spectrum controller 410 includes an operator 500 and a logic controller 540. The operator 500 receives the original clock CLKi and the spread-spectrum clock SSCLK and outputs the write-in address Aw, the read-out address Ar and the buffer index Idx accordingly. The logic controller 540 receives the buffer index Idx and judges the time of the upward correction point or the downward correction point so as to control the up signal UP or the down signal DN accordingly.

The operator 500 includes counters 510 and 520 and a subtracter 530. The counter 510 receives the original clock CLKi and outputs the write-in address Aw accordingly. The counter 520 receives the spread-spectrum clock SSCLK and outputs the read-out address Ar accordingly. The subtracter 530 outputs the buffer index Idx according to the difference between the read-out address Ar and the write-in address Aw.

Figure 6A:
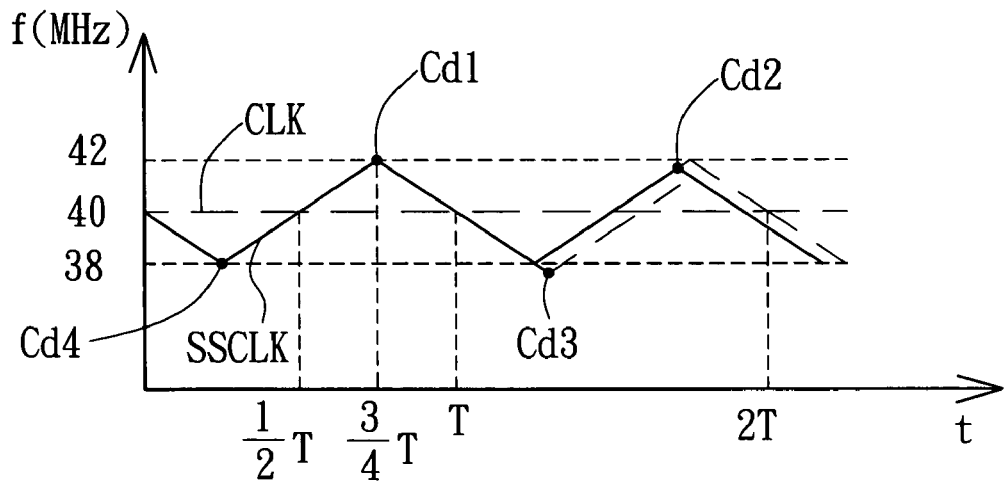
FIG. 6A is a graph showing relationships between the frequency and time of the original clock and the spread-spectrum clock of the invention.
Figure 6B:
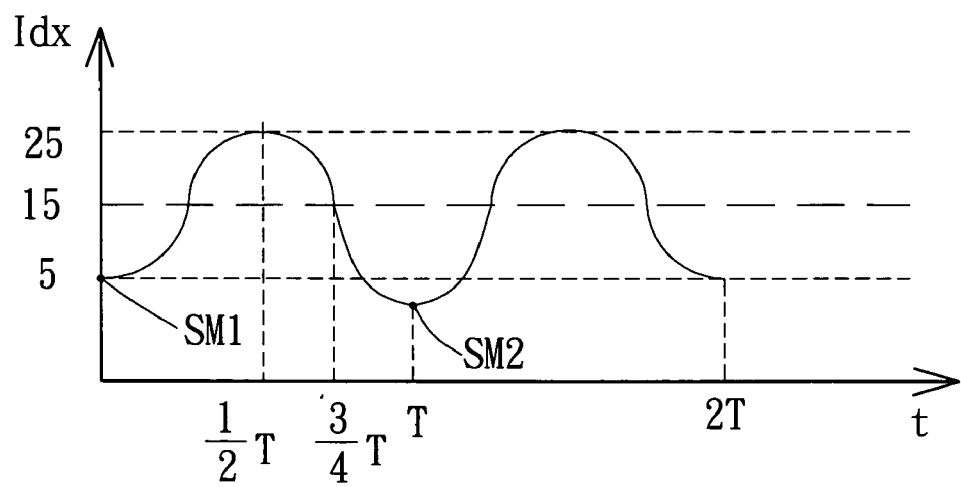
FIG. 6B is a graph showing the relationship between the buffer index and time of FIG. 6A.

FIG. 6A is a graph showing relationships between the frequency and time of the original clock and the spread-spectrum clock of the invention, wherein the difference between a local maximum of the spread-spectrum clock SSCLK and the original clock CLKi is defined as a positive magnitude of spread spectrum, and the difference between a local minimum of the spread-spectrum clock SSCLK and the original clock CLKi is defined as a negative magnitude of spread spectrum. However, the positive magnitude of spread spectrum and the negative magnitude of spread spectrum may not be constant at different time. The data bit stream Di is input according to the original clock CLKi, and the data bit stream Ds is output according to the spread-spectrum clock SSCLK. Since the frequency of the original clock CLKi is different from that of the spread-spectrum clock SSCLK, the spread-spectrum buffer 420 has to serve as a buffer to avoid data loss. The spread-spectrum buffer 420 of this embodiment has a storage for storing, for example, 32 sets of data. The storage of the spread-spectrum buffer 420 is represented by the buffer index Idx. FIG. 6B is a graph showing the relationship between the buffer index and time of FIG. 6A. When the frequency of the spread-spectrum clock SSCLK is smaller than that of the original clock CLKi, the speed of outputting the data bit stream Ds is slower than that of inputting the data bit stream Di, so the storage of the spread-spectrum buffer 420 will increase. That is, the buffer index Idx will increase, as shown from time 0 to T/2. When the frequency of the spread-spectrum clock SSCLK is greater than that of the original clock CLKi, the speed of outputting the data bit stream Ds is quicker than that of inputting the data bit stream Di, so the storage of the spread-spectrum buffer 420 will decrease. That is, the buffer index Idx will decrease, as shown from time T/2 to T.

Under a normal condition, the buffer index Idx ranges from 5 to 25. At this time, it is unnecessary to correct the spread-spectrum clock SSCLK. The time of occurrence of each of the upward correction point and the downward correction point of the spread-spectrum clock depends upon the buffer index in this embodiment. However, the time of occurrence may also depend upon other references such as time and the like. If the upward correction point and the downward correction point of the spread-spectrum clock need not to be corrected, the buffer index of, for example, 15 serves as the occurrence point.

However, if the storage of the spread-spectrum buffer 420 is insufficient (for example, the buffer index Idx is smaller than 5), the danger of no data for output may occur. If the spread-spectrum buffer 420 is approximately full (for example, the buffer index Idx is greater than 25), it may be dangerous that the input data cannot be stored in the insufficient space. Consequently, in addition to providing the buffer, a mechanism for monitoring the storage of the buffer further needs to be provided to tune the frequency of the spread-spectrum clock and to avoid any data loss accordingly.

Figure 7:
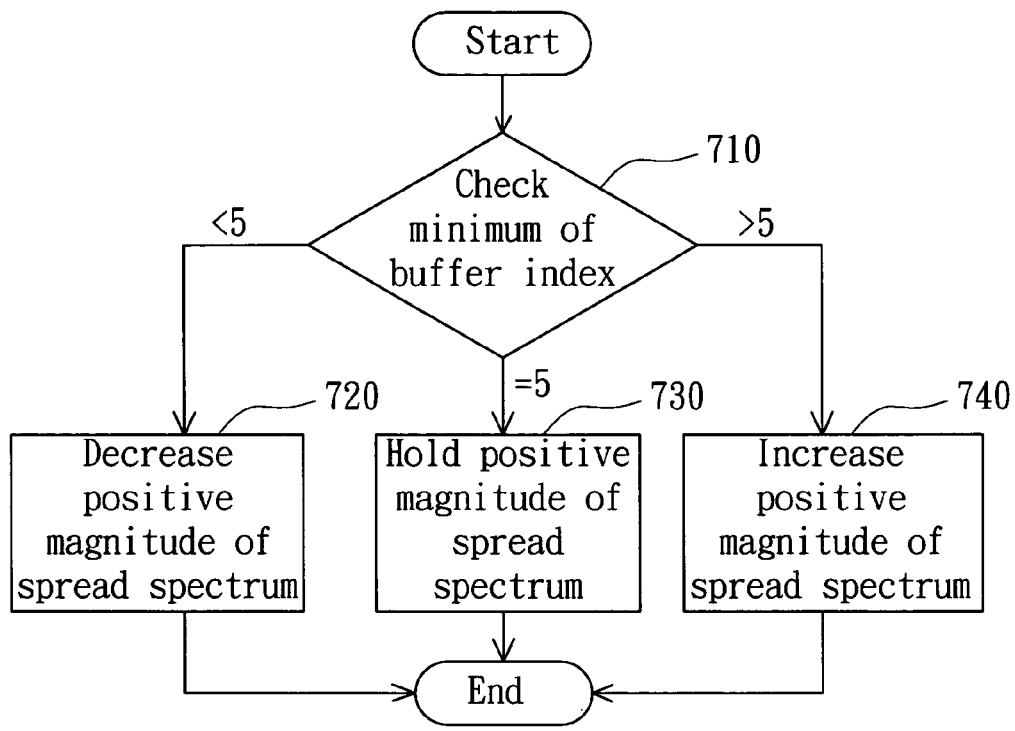
FIG. 7 is a flow chart showing a method of the logic controller for tuning the spread-spectrum clock according to a minimum of the buffer index.

FIG. 7 is a flow chart showing a method of the logic controller 540 for tuning the spread-spectrum clock according to a minimum of the buffer index. The method tunes the timing of the downward correction point of the spread-spectrum clock according the minimum of the buffer index Idx. Here, the default minimum threshold value of the buffer index Idx is defined as 5. In this method, the minimum of the buffer index Idx is checked first, as shown in step 710. Then, steps 720, 730 or 740 is performed according to the minimum and the minimum threshold value of the buffer index Idx.

In step 720, it means that the minimum of the buffer index Idx within a sweeping period is smaller than the minimum threshold value, and the positive magnitude of spread spectrum of the spread-spectrum clock is decreased, that is, the downward correction point of the next sweeping period is advanced. For example, at the time point T of FIG. 6B, the minimum SM2 of the buffer index Idx equals to 4, and the downward correction point of the next sweeping period is advanced to the point indicated by the symbol Cd2. That is, the frequency of the spread-spectrum clock SSCLK is corrected when the buffer index equals to 16 such that the frequency of the spread-spectrum clock SSCLK is decreased early to avoid data loss.

In step 730, it means that the minimum of the buffer index Idx within a sweeping period equals to the minimum threshold value, and the positive magnitude of spread spectrum of the spread-spectrum clock is held, that is, the downward correction point of the next sweeping period is kept unchanged. For example, when the minimum of the buffer index Idx equals to 5 (as shown in the symbol SM1 indicating the time point of 0 in FIG. 6B), the downward correction point of the next sweeping period is kept unchanged, as shown in the point indicated by the symbol Cd1 of FIG. 6A. That is, the downward correction point at that time still occurs when the buffer index Idx equals to 15.

In step 740, it means that the minimum of the buffer index Idx within a sweeping period is greater than the minimum threshold value, and the positive magnitude of spread spectrum of the spread-spectrum clock is increased, that is, the downward correction point of the next sweeping period is delayed. For example, the downward correction point is caused to occur when the buffer index equals to 14, such that the decreasing of the frequency of the spread-spectrum clock SSCLK is delayed. Accordingly, the spread-spectrum clock SSCLK may be spread wider, and the electromagnetic interference may further be avoided.

It should be noticed that the logic controller 540 may tune the spread-spectrum clock by step 710 and step 720, ignoring step 730 and step 740.

Figure 8:
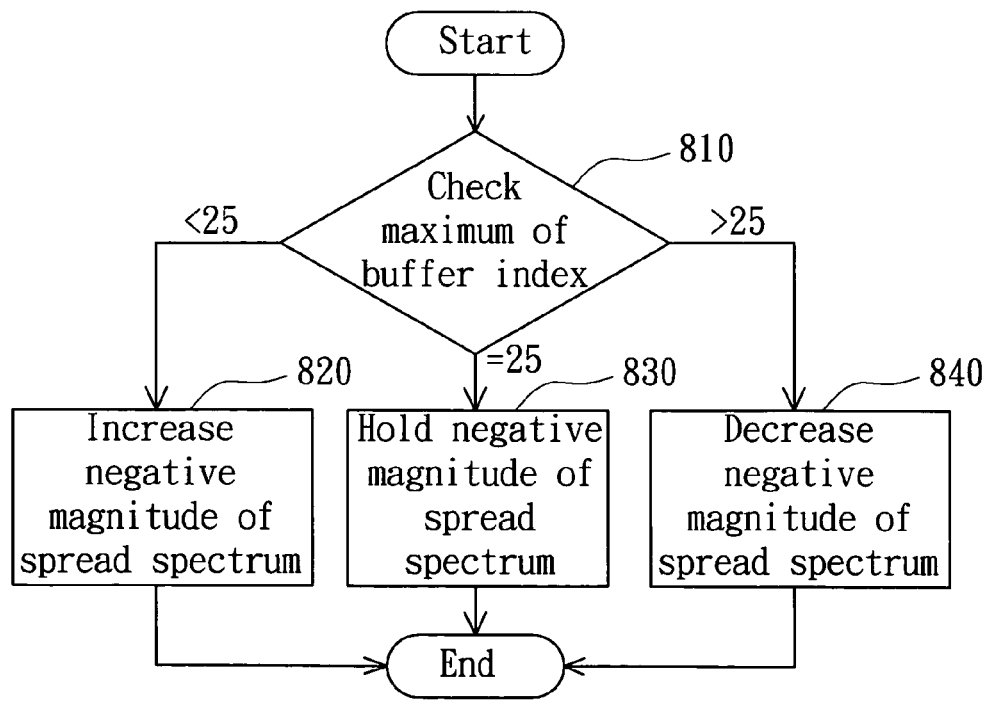
FIG. 8 is a flow chart showing a method of the logic controller for tuning the spread-spectrum clock according to a maximum of the buffer index.

FIG. 8 is a flow chart showing a method of the logic controller 540 for tuning the spread-spectrum clock according to a maximum of the buffer index. The method tunes the timing of the upward correction point of the spread-spectrum clock according the maximum of the buffer index Idx. Here, the default maximum threshold value of the buffer index is defined as 25. In this method, the maximum of the buffer index Idx is checked first, as shown in step 810. Then, steps 820, 830 or 840 is performed according to the maximum and the maximum threshold value of the buffer index Idx.

In step 820, it means that the maximum of the buffer index Idx within a sweeping period is smaller than the maximum threshold value, and the negative magnitude of spread spectrum of the spread-spectrum clock is increased, that is, the upward correction point of the next sweeping period is delayed such that the increasing of the frequency of the spread-spectrum clock SSCLK is delayed. Accordingly, the spread-spectrum clock SSCLK may be spread wider, and the electromagnetic interference may further be avoided.

In step 830, it means that the minimum of the buffer index Idx within a sweeping period equals to the minimum threshold value, and the negative magnitude of spread spectrum of the spread-spectrum clock is held, that is, the upward correction point of the next sweeping period is kept unchanged.

Figure 11A:
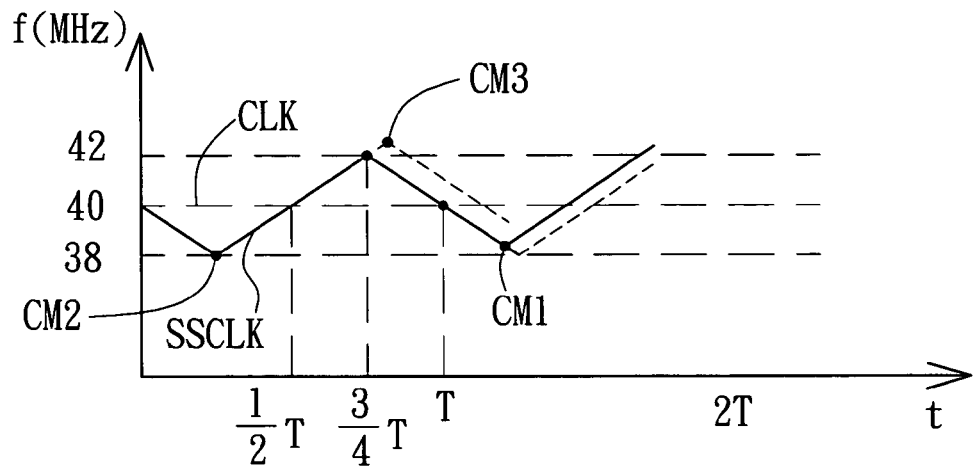
FIGS. 11A and 11B are graphs showing relationships between the spread-spectrum clock and time and between the buffer index and time.
Figure 11B:
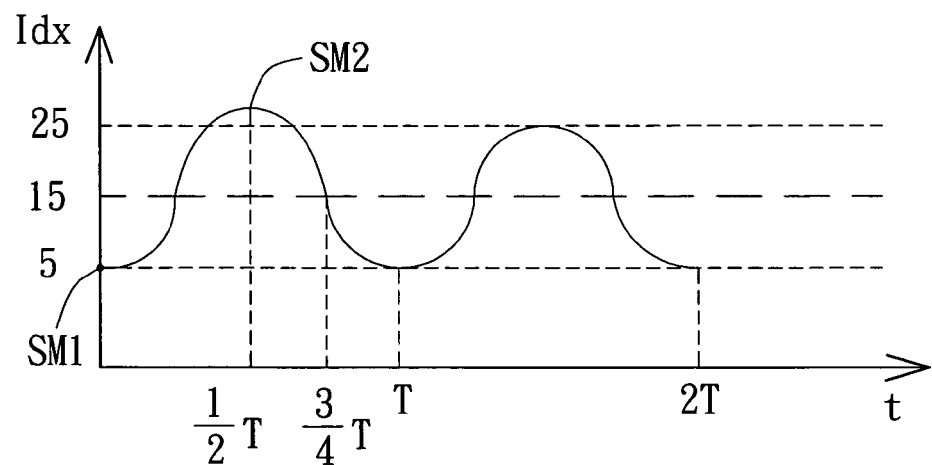

In step 840, it means that the maximum of the buffer index Idx within a sweeping period is greater than the maximum threshold value, and the negative magnitude of spread spectrum of the spread-spectrum clock is decreased, that is, the upward correction point of the next sweeping period is advanced, such that the original clock CLKi is spread narrower to avoid data loss. Please refer simultaneously to FIGS. 11A and 11B, which are graphs showing relationships between the spread-spectrum clock and time and between the buffer index and time. At the time T/2 of FIG. 11B, the maximum SM2 of the buffer index Idx equals to 26, and the upward correction point of the next sweeping period is advanced to point CM1 of FIG. 11A. That is, the frequency of the spread-spectrum clock SSCLK is corrected when the buffer index equals to 14 so that the frequency of the spread-spectrum clock SSCLK is increased early to avoid data loss.

It should be noticed that the logic controller 540 may tune the spread-spectrum clock by step 810 and step 840, ignoring step 820 and step 830.

Figure 9:
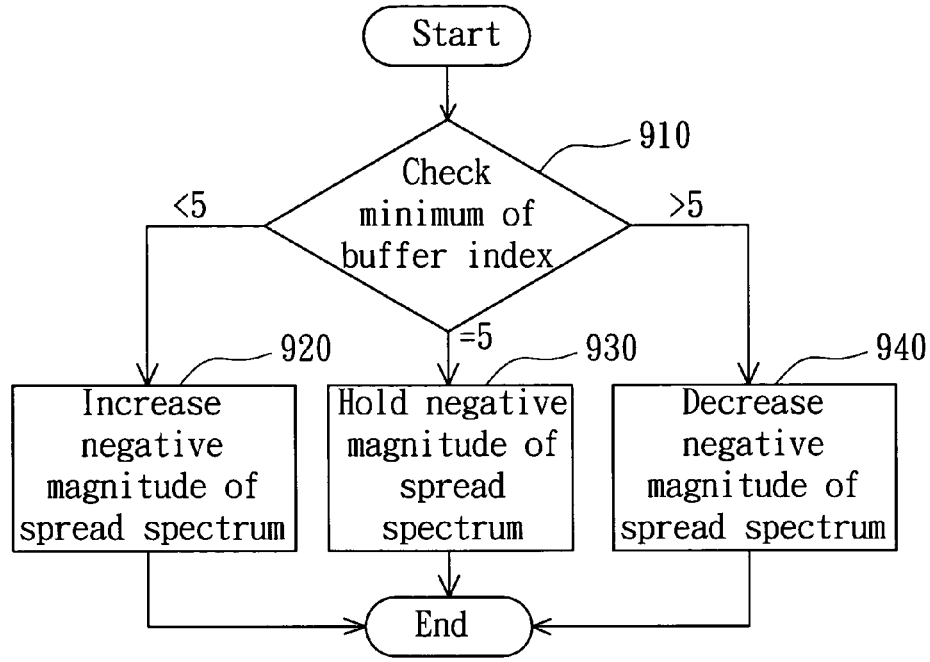
FIG. 9 is a flow chart showing a method of the logic controller for tuning the spread-spectrum clock according to a minimum of the buffer index.

FIG. 9 is a flow chart showing a method of the logic controller 540 for tuning the spread-spectrum clock according to a minimum of the buffer index. The method tunes the timing of the upward correction point of the spread-spectrum clock according the minimum of the buffer index Idx. Here, the default minimum threshold value of the buffer index Idx is defined as 5. In this method, the minimum of the buffer index Idx is checked first, as shown in step 910. Then, steps 920, 930 or 940 is performed according to the minimum and the minimum threshold value of the buffer index Idx.

In step 920, it means that the minimum of the buffer index Idx within a sweeping period is smaller than the minimum threshold value, and the negative magnitude of spread spectrum of the spread-spectrum clock is increased, that is, the upward correction point of the next sweeping period is delayed. For example, at the time point T of FIG. 6B, the minimum SM2 of the buffer index Idx equals to 4, and the upward correction point of the next sweeping period is delayed to the point indicated by the symbol Cd3. That is, the frequency of the spread-spectrum clock SSCLK is corrected when the buffer index equals to 16 such that the increasing of the frequency of the spread-spectrum clock SSCLK is delayed. Accordingly, the spread-spectrum clock SSCLK may be spread wider to avoid data loss.

In step 930, it means that the minimum of the buffer index Idx within a sweeping period equals to the minimum threshold value, and the negative magnitude of spread spectrum of the spread-spectrum clock is held, that is, the upward correction point of the next sweeping period is kept unchanged. For example, when the minimum of the buffer index Idx equals to 5 (as shown in the symbol SM1 indicating the time point of 0 in FIG. 6B), the upward correction point of the next sweeping period is kept unchanged, as shown in the point indicated by the symbol Cd4 of FIG. 6A. That is, the upward correction point at that time still occurs when the buffer index Idx equals to 15.

In step 940, it means that the minimum of the buffer index Idx within a sweeping period is greater than the minimum threshold value, and the negative magnitude of spread spectrum of the spread-spectrum clock is decreased, that is, the upward correction point of the next sweeping period is advanced. For example, the upward correction point is caused to occur when the buffer index equals to 14, such that the increasing of the frequency of the spread-spectrum clock SSCLK is advanced.

It should be noticed that the logic controller 540 may tune the spread-spectrum clock by step 910 and step 920, ignoring step 930 and step 940.

Figure 10:
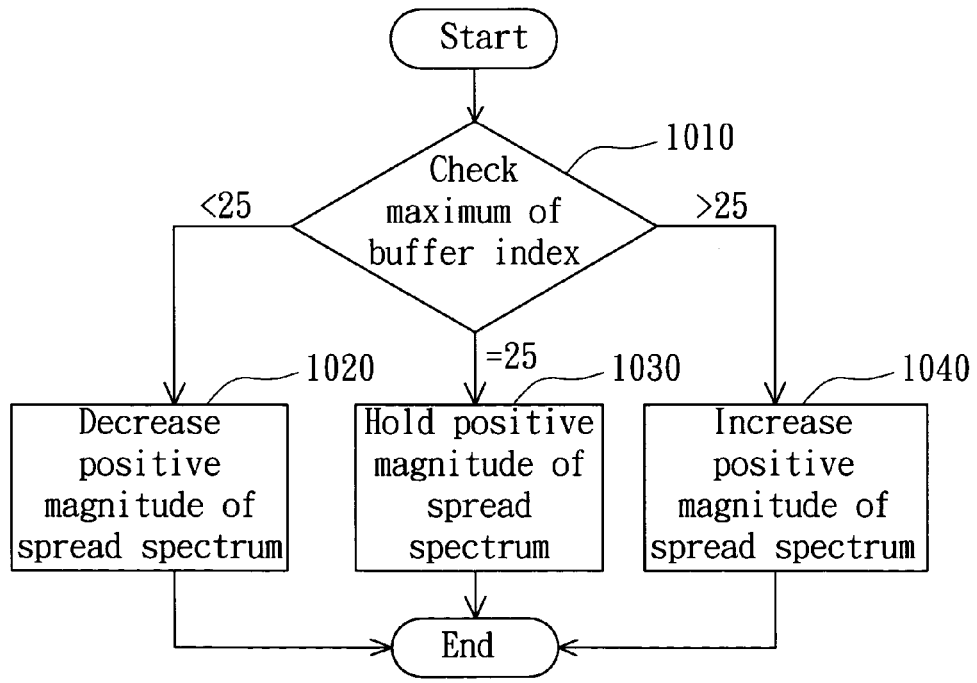
FIG. 10 is a flow chart showing a method of the logic controller for tuning the spread-spectrum clock according to a maximum of the buffer index.

FIG. 10 is a flow chart showing a method of the logic controller 540 for tuning the spread-spectrum clock according to a maximum of the buffer index. The method tunes the timing of the downward correction point of the spread-spectrum clock according the maximum of the buffer index Idx. Here, the default maximum threshold value of the buffer index is defined as 25. In this method, the maximum of the buffer index Idx is checked first, as shown in step 1010. Then, steps 1020, 1030 or 1040 is performed according to the maximum and the maximum threshold value of the buffer index Idx.

In step 1020, it means that the maximum of the buffer index Idx within a sweeping period is smaller than the maximum threshold value, and the positive magnitude of spread spectrum of the spread-spectrum clock is decreased, that is, the downward correction point of the next sweeping period is advanced such that the decreasing of the frequency of the spread-spectrum clock SSCLK is advanced.

In step 1030, it means that the minimum of the buffer index Idx within a sweeping period equals to the minimum threshold value, and the positive magnitude of spread spectrum of the spread-spectrum clock is held, that is, the downward correction point of the next sweeping period is kept unchanged.

In step 1040, it means that the maximum of the buffer index Idx within a sweeping period is greater than the maximum threshold value, and the positive magnitude of spread spectrum of the spread-spectrum clock is increased, that is, the downward correction point of the next sweeping period is delayed, such that the original clock CLKi is spread wider to avoid data loss. Please refer simultaneously to FIGS. 11A and 11B, which are graphs showing relationships between the spread-spectrum clock and time and between the buffer index and time. At the time T/2 of FIG. 11B, the maximum SM2 of the buffer index Idx equals to 26, and the downward correction point of the next sweeping period is delayed to point CM3 of FIG. 11A. That is, the frequency of the spread-spectrum clock SSCLK is corrected when the buffer index equals to 14 so that the frequency of the spread-spectrum clock SSCLK is decreased late to avoid data loss.

It should be noticed that the logic controller 540 may tune the spread-spectrum clock by step 1010 and step 1040, ignoring step 1020 and step 1030.

The apparatus and method for reducing electromagnetic interference according to the embodiments of the invention can reduce the electromagnetic interference using the spread-spectrum clock and can avoid data loss.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for reducing electromagnetic interference, the apparatus generating a spread-spectrum clock according to an original clock having an original clock frequency, receiving an input data bit stream according to the original clock, and outputting an output data bit stream according to the spread-spectrum clock, wherein the spread-spectrum clock has a frequency which varies between a maximum frequency that is higher than the original clock frequency and a minimum frequency that is lower than the original clock frequency, and wherein a difference between a local maximum of the spread-spectrum clock and the original clock is defined as a positive magnitude of spread-spectrum and a difference between a local minimum of the spread-spectrum clock and the original clock is defined as a negative magnitude of spread spectrum, and the apparatus comprises:

a spread-spectrum buffer for temporarily storing units of data in the input data bit stream according to the original clock and outputting units of data in the output data bit stream according to the spread-spectrum clock, wherein the spread-spectrum buffer has a capacity to store up a to predetermined number of units and the number of units of data stored in the spread-spectrum buffer increases when the frequency of the spread-spectrum clock is lower than the original clock frequency and decreases when the frequency of the spread-spectrum clock is higher than the original clock frequency;

a spread-spectrum controller for receiving the original clock and the spread-spectrum clock and generating a write-in address for writing the input data bit stream into the spread-spectrum buffer and a read-out address for reading the output data bit stream out of the spread-spectrum buffer, wherein the spread-spectrum controller determines a buffer index which indicates the number of units of data currently stored in the spread-spectrum buffer, the spread-spectrum controller outputs an up signal or a down signal as a function of the buffer index, and according to the buffer index in a previous sweeping period, the spread-spectrum controller adjusts an occurrence time of a downward correction point, at which the frequency of the spread-spectrum clock reaches a local maximum and starts to decrease, in each sweeping period; and a frequency generator for receiving the up signal and the down signal and outputting the spread-spectrum clock, wherein the frequency generator increases the frequency of the spread-spectrum clock in response to the up signal and decreases the frequency of the spread-spectrum clock in response to the down signal.

2. The apparatus according to claim 1, wherein the spread-spectrum controller receives the original clock to generate the write-in address accordingly, receives the spread-spectrum clock to generate the read-out address accordingly, and generates the buffer index according to a difference between the read-out address and the write-in address.

3. The apparatus according to claim 1, wherein the spread-spectrum controller tunes the up signal and the down signal to enable the frequency generator to decrease the positive magnitude of spread spectrum of the spread-spectrum clock or increase the negative magnitude of spread spectrum of the spread-spectrum clock if the stored units of data of the spread-spectrum buffer is smaller than a minimum threshold value.

4. The apparatus according to claim 1, wherein the spread-spectrum controller enables the frequency generator to hold the positive or the negative magnitude of spread spectrum of the spread-spectrum clock if the stored units of data of the spread-spectrum buffer equals to a minimum threshold value.

5. The apparatus according to claim 1, wherein the spread-spectrum controller tunes the up signal and the down signal to enable the frequency generator to increase the positive magnitude of spread spectrum of the spread-spectrum clock or decrease the negative magnitude of spread spectrum of the spread-spectrum clock if the stored units of data of the spread-spectrum buffer is greater than a minimum threshold value.

6. The apparatus according to claim 1, wherein the spread-spectrum controller tunes the up signal and the down signal to enable the frequency generator to increase the negative magnitude of spread spectrum of the spread-spectrum clock or decrease the positive magnitude of spread spectrum of the spread-spectrum clock if the stored units of data of the spread-spectrum buffer is smaller than a maximum threshold value.

7. The apparatus according to claim 1, wherein the spread-spectrum controller enables the frequency generator to hold the positive or the negative magnitude of spread spectrum of the spread-spectrum clock if the stored units of data of the spread-spectrum buffer equals to a maximum threshold value.

8. The apparatus according to claim 1, wherein the spread-spectrum controller tunes the up signal and the down signal to enable the frequency generator to decrease the negative magnitude of spread spectrum of the spread-spectrum clock or increase the positive magnitude of spread spectrum of the spread-spectrum clock if the stored units of data of the spread-spectrum buffer is greater than a maximum threshold value.

9. The apparatus according to claim 2, wherein the spread-spectrum controller comprises:
- an operator for generating the write-in address, the read-out address and the buffer index according to the original clock and the spread-spectrum clock; and
- a logic controller for generating the up signal and the down signal according to the buffer index.

10. The apparatus according to claim 9, wherein the operator comprises:
- a first counter for generating the write-in address according to the original clock;
- a second counter for generating the read-out address according to the spread-spectrum clock; and
- a subtracter for generating the buffer index according to the difference between the read-out address and the write-in address.

11. A method, which is adapted to the apparatus according to claim 1, for tuning a frequency of a spread-spectrum clock, the method comprising the steps of:
- receiving the stored units of data of the spread-spectrum buffer; and
- determining the positive magnitude of spread spectrum of the spread-spectrum clock according to the stored units of data of the spread-spectrum buffer and a minimum threshold value, wherein:
- if the stored units of data of the spread-spectrum buffer is smaller than the minimum threshold value, the frequency generator is caused to decrease the positive magnitude of spread spectrum of the spread-spectrum clock.

12. The method according to claim 11, wherein the steps of determining the positive magnitude further comprising:
- if the stored units of data of the spread-spectrum buffer equals to the minimum threshold value, the frequency generator is caused to hold the positive magnitude of spread spectrum of the spread-spectrum clock; and
- if the stored units of data of the spread-spectrum buffer is greater than the minimum threshold value, the frequency generator is caused to increase the positive magnitude of spread spectrum of the spread-spectrum clock.

13. The method according to claim 12, wherein the positive magnitude of spread spectrum of the spread-spectrum clock is tuned by tuning occurrence time of a switching point of frequency-decreasing to frequency-increasing of the spread-spectrum clock after the local maximum and the local minimum of the stored units of data of the spread-spectrum buffer are detected within a period of time.

14. A method, which is adapted to the apparatus according to claim 1, for tuning a frequency of a spread-spectrum clock, the method comprising the steps of:
- receiving the stored units of data of the spread-spectrum buffer; and
- determining the negative magnitude of spread spectrum of the spread-spectrum clock according to the stored units of data of the spread-spectrum buffer and a maximum threshold value, wherein:
- if the stored units of data of the spread-spectrum buffer is greater than the maximum threshold value, the frequency generator is caused to decrease the negative magnitude of spread spectrum of the spread-spectrum clock.

15. The method according to claim 14, wherein the steps of determining the negative magnitude further comprising:
- if the stored units of data of the spread-spectrum buffer equals to the maximum threshold value, the frequency generator is caused to hold the negative magnitude of spread spectrum of the spread-spectrum clock; and
- if the stored units of data of the spread-spectrum buffer is smaller than the maximum threshold value, the frequency generator is caused to increase the negative magnitude of spread spectrum of the spread-spectrum clock.

16. The method according to claim 15, wherein the negative magnitude of spread spectrum of the spread-spectrum clock is tuned by tuning occurrence time of a switching point of frequency-increasing to frequency-decreasing of the spread-spectrum clock after the local maximum and the local minimum of the stored units of data of the spread-spectrum buffer are detected within a period of time.

17. A method, which is adapted to the apparatus according to claim 1, for tuning a frequency of a spread-spectrum clock, the method comprising the steps of:
- receiving the stored units of data of the spread-spectrum buffer; and
- determining the negative magnitude of spread spectrum of the spread-spectrum clock according to the stored units of data of the spread-spectrum buffer and a minimum threshold value, wherein:
- if the stored units of data of the spread-spectrum buffer is smaller than the minimum threshold value, the frequency generator is caused to increase the negative magnitude of spread spectrum of the spread-spectrum clock.

18. The method according to claim 17, wherein the steps of determining the negative magnitude further comprising:
- if the stored units of data of the spread-spectrum buffer equals to the minimum threshold value, the frequency generator is caused to hold the negative magnitude of spread spectrum of the spread-spectrum clock; and
- if the stored units of data of the spread-spectrum buffer is greater than the minimum threshold value, the frequency generator is caused to decrease the negative magnitude of spread spectrum of the spread-spectrum clock.

19. A method, which is adapted to the apparatus according to claim 1, for tuning a frequency of a spread-spectrum clock, the method comprising the steps of:
- receiving the stored units of data of the spread-spectrum buffer; and
- determining the positive magnitude of spread spectrum of the spread-spectrum clock according to the stored units of data of the spread-spectrum buffer and a maximum threshold value, wherein:
- if the stored units of data of the spread-spectrum buffer is greater than the maximum threshold value, the frequency generator is caused to increase the positive magnitude of spread spectrum of the spread-spectrum clock.

20. The method according to claim 14, wherein the steps of determining the positive magnitude further comprising:
- if the stored units of data of the spread-spectrum buffer equals to the maximum threshold value, the frequency generator is caused to hold the positive magnitude of spread spectrum of the spread-spectrum clock; and
- if the stored units of data of the spread-spectrum buffer is smaller than the maximum threshold value, the frequency generator is caused to decrease the positive magnitude of spread spectrum of the spread-spectrum clock.

* * * * *